(12) United States Patent
Ozawa et al.

(10) Patent No.: US 6,779,957 B2
(45) Date of Patent: Aug. 24, 2004

(54) BOLT, METHOD OF FASTENING MEMBERS WITH THE USE OF THE BOLT, AND METHOD OF RELEASING FASTENING

(75) Inventors: Junzo Ozawa, Niwa-gun (JP); Hiromichi Mizuno, Niwa-gun (JP); Shuji Ito, Niwa-gun (JP); Masafumi Takahashi, Niwa-gun (JP); Kenji Inagaki, Niwa-gun (JP); Masahito Yabuoshi, Chiryu (JP)

(73) Assignee: Aoyama Seisakusho Co., Ltd., Nagoya (JP)

( * ) Notice: Subject to any disclaimer, the term of this patent is extended or adjusted under 35 U.S.C. 154(b) by 0 days.

(21) Appl. No.: 10/110,419
(22) PCT Filed: Aug. 9, 2001
(86) PCT No.: PCT/JP01/06846
§ 371 (c)(1),
(2), (4) Date: Apr. 11, 2002
(87) PCT Pub. No.: WO02/14700
PCT Pub. Date: Feb. 21, 2002

(65) Prior Publication Data
US 2002/0197130 A1 Dec. 26, 2002

(30) Foreign Application Priority Data
Aug. 10, 2000 (JP) .................................. 2000-242723

(51) Int. Cl.$^7$ .................................. F16B 21/18; F16B 35/02
(52) U.S. Cl. .................. 411/384; 411/311; 411/353; 411/535

(58) Field of Search .................. 411/302, 307, 411/310, 311, 352, 353, 383, 384, 535, 546

(56) References Cited

U.S. PATENT DOCUMENTS

| 3,381,733 A | * | 5/1968 | Stanwick ............... 411/311 |
| 3,568,746 A | * | 3/1971 | Faroni et al. ............ 411/302 |
| 3,850,215 A | * | 11/1974 | Lomoski ................ 411/311 |
| 4,043,239 A | * | 8/1977 | DeFusco |
| 4,237,948 A | * | 12/1980 | Jones et al. ............. 411/307 |
| 4,927,307 A | * | 5/1990 | Fitzgerald et al. ........ 411/302 |
| 6,357,953 B1 | * | 3/2002 | Ballantyne ............. 411/383 |

FOREIGN PATENT DOCUMENTS

| EP | 0 373 049 A1 | 6/1990 |
| EP | 0 534 001 A1 | 3/1993 |

* cited by examiner

Primary Examiner—Neill Wilson
(74) Attorney, Agent, or Firm—Frishauf, Holtz, Goodman & Chick, P.C.

(57) ABSTRACT

The invention relates to a bolt for integrally fastening a first member and a second member, which are spaced away to each other, the bolt comprising a cylindrical-shaped collar bolt provided on a portion of an outer peripheral surface thereof with an external thread portion and on an inner peripheral surface thereof with an internal thread portion; and a bolt body having in an area of one end of a shank an external thread portion capable of threading into the internal thread portion of the collar bolt and a head on the other end thereof.

15 Claims, 10 Drawing Sheets

$\alpha, \beta$: FLANK ANGLE ($\alpha < \beta$)

BOLT, METHOD OF FASTENING MEMBERS WITH THE USE OF THE BOLT, AND METHOD OF RELEASING FASTENING

This application is a U.S. National Phase Application under 35 USC 371 of International Application PCT/JP01/06846 (not published in English) filed Aug. 9, 2001.

TECHNICAL FIELD

The invention relates to a bolt capable of fastening two members, which involve dimensional dispersion in a spacing therebetween and positions of centers of holes intended for fastening, while absorbing such dispersion, a method of fastening members with the use of the bolt, and a method of releasing fastening.

BACKGROUND ART

In the case where both ends of a lengthy member called an inner panel reinforcement 52 (hereinafter referred to as "reinforcement") is mounted on an end surface of a car body 51 as shown in, for example, FIG. 13, the car body 51 and the reinforcement 52 are susceptible of dispersion in positions where bolts are mounted, due to dispersion in press work and assembly accuracy of the car body 51 and the reinforcement 52. Conventionally, bolting to the car body 51 is performed by making an adjusting member 53 intervene, which is L-shaped in cross section, on one side of the reinforcement 52, and making use of a slot 54 of the adjusting member 53 to adjust relative positions of the adjusting member 53 and the reinforcement 52. However, when such adjusting member 53 is used, there is caused a problem that the number of parts increases as compared with the case where the reinforcement 52 is bolted directly, and the number of bolts being fastened also increases, which leads to an increase in manday for the fastening work.

DISCLOSURE OF INVENTION

The invention has been thought of to solve the above-mentioned problems of the prior art and to provide a bolt capable of surely and readily bolting two members, separated by a space and having dispersion in dimensional accuracy, without the use of any adjusting member and while absorbing the dispersion, a method of fastening members with the use of the bolt, and a method of releasing fastening.

To solve the above-mentioned problems, a bolt according to the invention is one for integrally fastening a first member and a second member, which are spaced away to each other, the bolt comprising a cylindrical-shaped collar bolt provided on a portion of an outer peripheral surface thereof with an external thread portion and on an inner peripheral surface thereof with an internal thread portion, and a bolt body having in an area of one end of a shank an external thread portion capable of threading into the internal thread portion of the collar bolt and a head on the other end thereof, and wherein either of the external thread portion of the bolt body and the internal thread portion of the collar bolt is formed with a special thread ridge portion, which requires torque more than that required for engagement of normal thread ridges when engagement of the external thread portion of the bolt body and the internal thread portion of the collar bolt is to be released.

Meanwhile, a method of fastening two spaced members with the use of a bolt according to the invention comprises imparting torque to the bolt to cause the external thread portion of the collar bolt to be threaded into an internal thread portion formed in a threaded hole of one of the members (first member) being fastened, after a lower end of the collar bolt is caused to abut against a surface of the other of the members (second member), further imparting torque to the bolt to release threading of the external thread portion of the bolt body and the internal thread portion of the collar bolt to separate the collar bolt from the bolt body, and thereafter threading the external thread portion of the bolt body into a internal thread portion formed in a threaded hole of the second member to integrally fasten the two spaced members.

Also, a method of releasing fastening of two spaced members, that is a first member and a second member, which have been fastened together according to the above-mentioned method, comprises, by reversely rotating the bolt body of the bolt, performing in order the steps of releasing threading of the external thread portion of the bolt body and the internal thread portion of the second member, again performing threading of the external thread portion of the bolt body and the internal thread portion of the collar bolt, and releasing threading of the external thread portion of the bolt body and the internal thread portion of the first member.

BEST MODE FOR CARRYING OUT THE INVENTION

The invention will be described in detail with reference to the drawings, in which an embodiment of the invention is shown.

Figure 1:
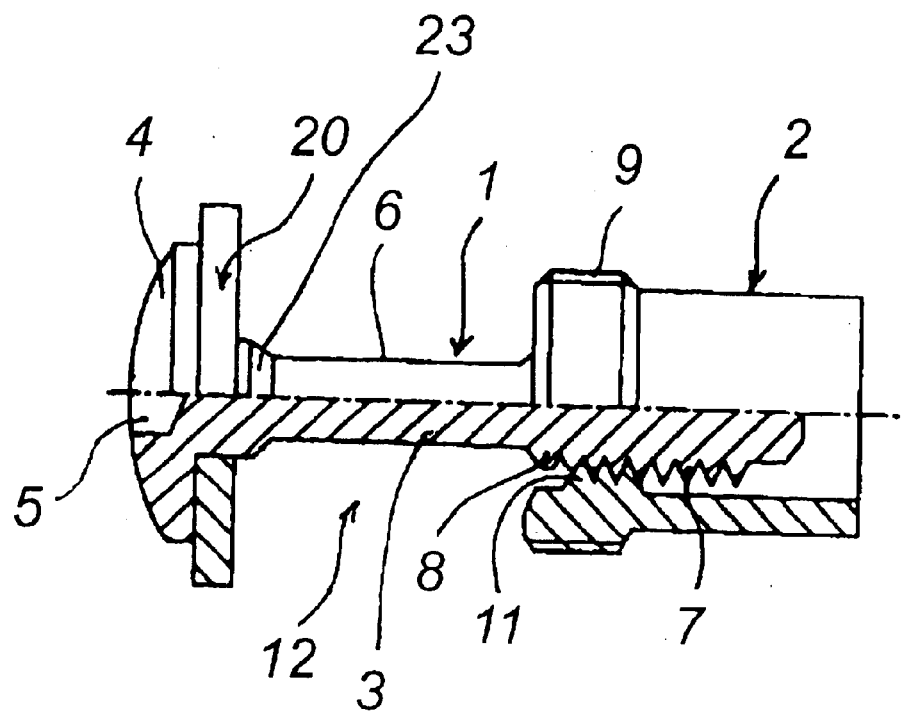
FIG. 1 is a partial, cross sectional view showing the entire constitution of a bolt according to the invention.
Figure 2:
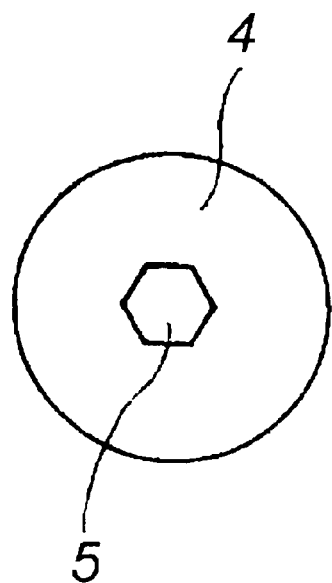
FIG. 2 is a plan view showing a configuration of a bolt head of a bolt body being a constituent element of the bolt according to the invention.

A bolt body 1 as a constituent element of a bolt is provided at one end (an end in a direction opposite to that, in which the bolt is inserted) of a shank portion 3 with a circular head 4, which is a round head of a substantially semi-spherical shape, and which is provided with a hexagonal-shaped recess 5 for transmission of torque (see FIGS. 1 and 2). Also, the shank portion 3 is formed with a small-diameter portion 6 of a somewhat smaller diameter than those of other portions (the small-diameter portion may be formed by machining but is more preferably formed by a diameter-reduction work such as rolling since the work is carried out simultaneously with threading). An external thread portion 7 comprising complete thread ridges is formed to extend to the other end of the bolt from a center thereof (See FIG. 1. The external thread portion is generally formed by rolling.). A special thread ridge portion 8 is formed on a portion on a head side of the external thread portion 7 (see FIG. 1).

Figure 4:
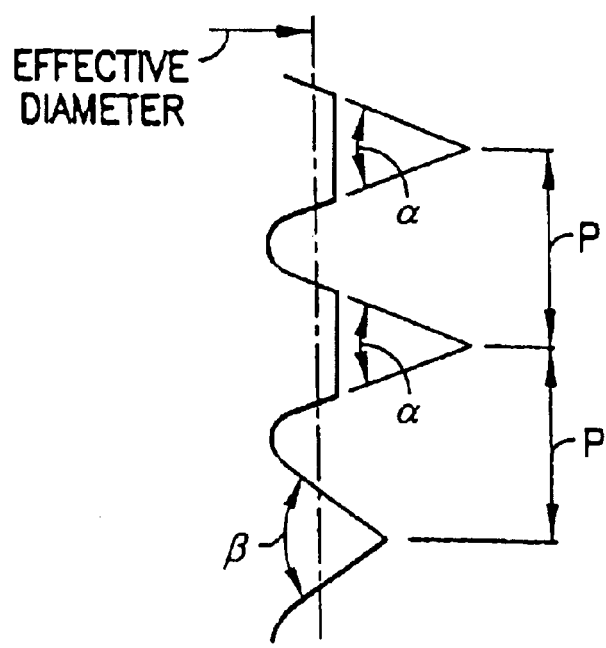
FIG. 4 is an enlarged, cross sectional view showing a configuration of special thread ridges on the bolt body or the collar bolt, as a constituent element of the bolt according to the invention.
Figure 5:
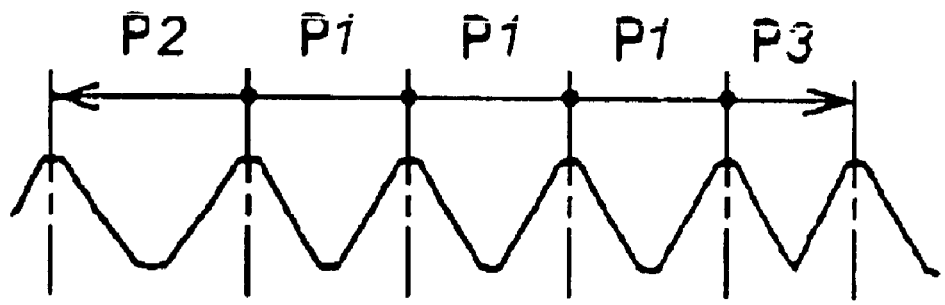
FIG. 5 is an enlarged, cross sectional view showing another configuration of special thread ridges on the bolt body or the collar bolt, as a constituent element of the bolt according to the invention.

Typical of the special thread ridge portion are one, in which crests of the thread ridges are pressed in a diametrical direction and metal present in the crests is moved to flanks due to plastic flow to deform the cross section of the crests into a trapezoidal shape (See FIG. 4. Hereinafter, such portion is referred to as "reduced-diameter thread ridge portion", and such thread ridges are referred to as "reduced-diameter thread ridges". Here, the reduced-diameter thread ridges have the same in pitch P as normal thread ridges but have a smaller flank angle than that β of normal thread ridges. Usually, is on the order of 60°, and β is on the order of 40°. When thread ridges having such a small flank angle are made to thread with normal thread ridges, flanks of the both thread ridges overlap with each other, so that such threading requires a great torque as compared with threading among normal thread ridges. In other words, a great torque is required for release of such threading as compared with threading among normal thread ridges. Also, it is sufficient that a region where the reduced-diameter thread ridges are formed is 1 to 10 in terms of number of thread ridges and is 10 to 360° in terms of an angle about an axis, preferably 2 to 10 and 10 to 90°. In addition, it is unnecessary to form the reduced-diameter thread ridges over an entire circumference around an axis but it suffices to form them in at least one location around an axis.), and one, a part of thread ridges of which has a greater or less pitch P2 or P3 than that P1 of normal thread ridges (See FIG. 5. Hereinafter, such portion is referred to as "pitch-lock portion", and such thread ridges are referred to as "pitch-lock thread ridges". Here, it suffices that an extent, to which the pitch-lock thread ridges are deformed, is on the order of ±20% of P1 in terms of pitch, and a region where the pitch-lock thread ridges are formed is at least one in a + (plus) direction and in a − (minus) direction (direction opposite to the + direction) in terms of number of thread ridges.). Of course, the special thread ridge portion may include other configurations, for example, one, of which thread ridges have the same shape, flank angle and pitch as those of normal thread ridges and are formed thereon with a thin layer (It is preferable that once when formed, the thin layer will not fall off from a location where it is formed, as long as it is not intentionally peeled off, and will not bond to a member, against which it abuts) of a resin such as special nylon (The resin typically includes "Nylok" (trade mark) manufactured by United States Nylok Company. In addition, formation of such thin layer may be performed in accordance with a common method such as ones described in, for example, U.S. patent application Ser. Nos. 371,604/1964; 398,495/1964; 599,042/1966; 628,683/1967; 821,178/1969; 203,130/1972; and 400,502/1973 and U.S. Pat. Nos. RE28,812/1978; 3,995,074/1976; 4,054,688/1977; 4,100,882/1978; and 4,012,993/1978), and one, of which thread ridges are formed from an elastic body, for example, an elastomer resin. In addition, while the special thread ridge portion is provided on the bolt body in the drawings and the above-mentioned description, the purpose of provision of the special thread ridge portion is to prevent engagement of the bolt body and the collar bolt from being released as long as torque of a predetermined value is not applied, so that the special thread ridge portion may be of course provided on a side of the collar bolt (The same is applied with the following.).

In addition, as described later, a diameter of the small-diameter portion 6 is smaller than a minor diameter of external thread of normal thread ridges and the special thread ridge portion 8 (the order of 100 to 50% of the latter, preferably, 80 to 60%) so that in fastening of two members, the bolt body having been released from engagement with the collar bolt can advance smoothly through an inner bore of the collar bolt and can absorb deviation in centers of holes, respectively, provided in first and second members.

Also, provided immediately below the head 4 of the bolt body 1 is a washer insertion portion 23 having a larger diameter than that of the small-diameter portion 6 to reduce a contact area between a back surface of the head and the washer 20 as much as possible to prevent the washer from rotating together with the bolt body when the two members are to be fastened (see FIG. 1). In addition, the chamfering or rounding work is applied to a lower end of the washer insertion portion 23 to provide inclination thereon so that the washer 20 can be smoothly inserted into the washer insertion portion (see FIG. 1).

Figure 3:
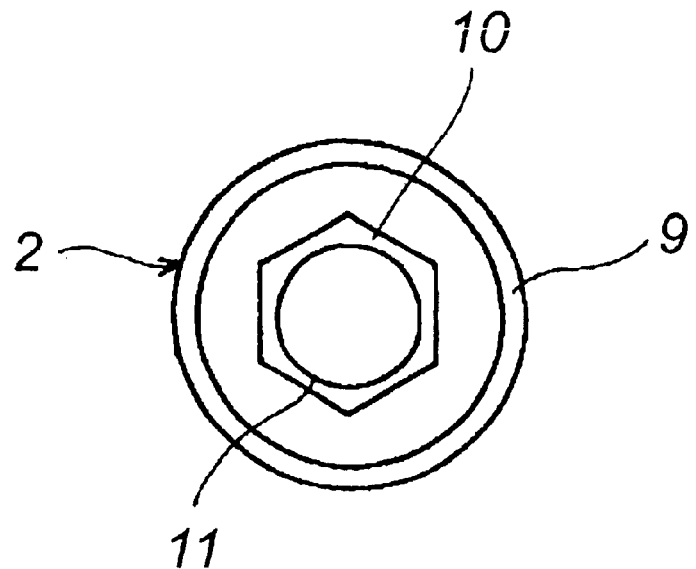
FIG. 3 is a plan view showing a configuration of a collar bolt being a constituent element of the bolt according to the invention.
Figure 6:
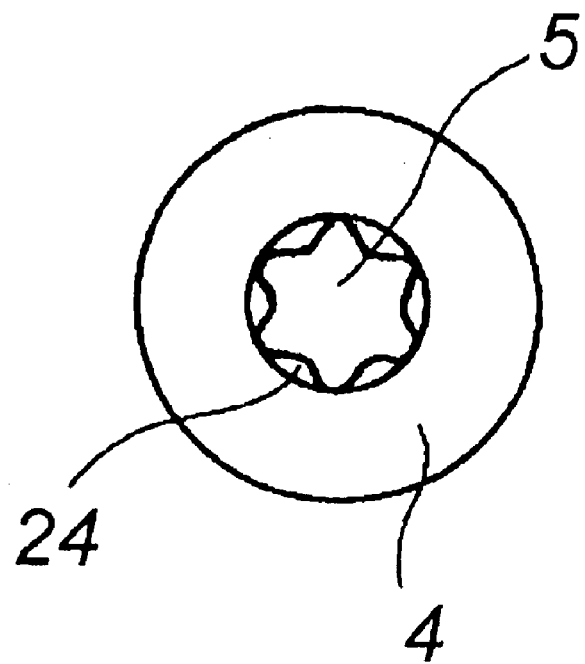
FIG. 6 is an enlarged, cross sectional view showing another configuration of a bolt head of the bolt body as a constituent element of the bolt according to the invention.

Meanwhile, the collar bolt 2 as a constituent element of the bolt is formed, as shown in FIG. 3, on a part of an outer peripheral surface thereof with an external thread portion 9, which is able to thread into an internal thread portion formed in a threaded hole of the first member, and furthermore the collar bolt is formed on one end thereof (an end in a direction opposite to that, in which the bolt is inserted) with a hexagonal recess 10 adapted for rotation of the collar bolt, and on an inner peripheral surface thereof with an internal thread portion 11 adapted to thread onto the special thread ridge portion 8 formed on the bolt body 1. In addition, torque transmitting portions 5, 10 provided on the bolt body and the collar bolt are torque transmitting means, and so their configurations suffice to be capable of smoothly transmitting load as applied, and can be made polygonal as well as hexagonal as shown and suitable to enable setting of a tool such as plus driver, minus driver, toque driver and the like. FIG. 6 shows an example of such configurations, in which convex ridge portions 24 are arranged at predetermined spacings on an inner peripheral surface of a hole 5 (circular) of the bolt head 4.

An explanation will be given below to a method of integrally fastening two members, which involve dispersion in relative positions between them, with the use of the bolt according to the invention (for the purpose of avoiding redundancy, an explanation will be given by way of an embodiment, in which the special thread ridges are reduced-diameter thread ridges and the reduced-diameter thread ridges are provided on a side of the bolt body. See FIGS. 7 to 11.).

A first member 13 and a second member 14, which are shown and are to be fastened to each other, involve dispersion in a spacing S, and a relative deviation is produced between positions of a central axis 21 of a threaded hole 15 of the first member and a central axis 22 of a threaded hole 17 of the second member.

Figure 7:
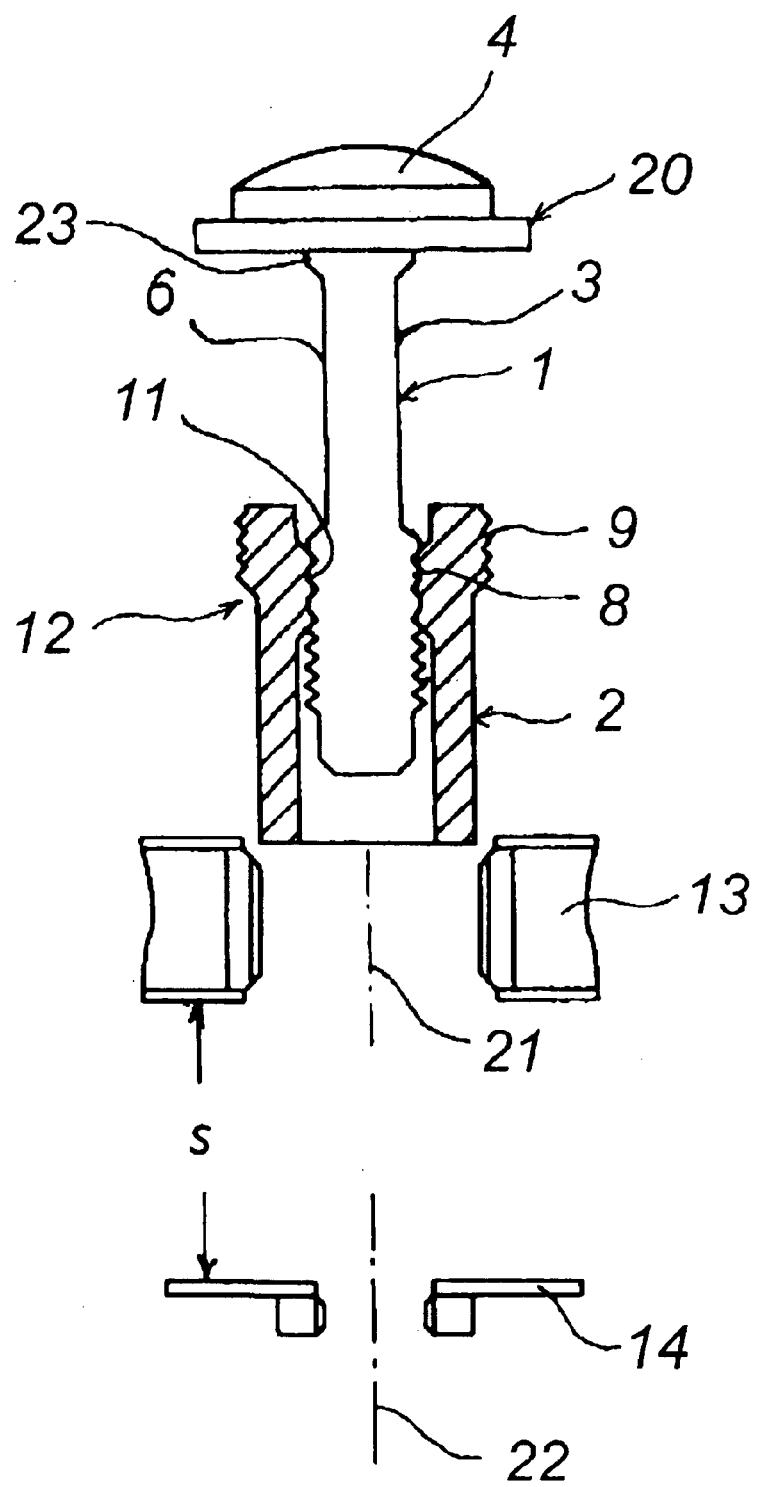
FIG. 7 is a partial, cross sectional view showing one step (a state before being mounted a bolt to a first member) of a method of fastening two members with the use of the bolt according to the invention.

When such two members are to be fastened to each other, the collar bolt 2 threaded onto the special thread ridge portion 8 of the bolt body 1 (the washer 20 is beforehand inserted into and mounted to the bolt body) through the internal thread portion 11 thereof at a predetermined torque is positioned in a desired position above the first member 13 (see FIG. 7).

Figure 8:
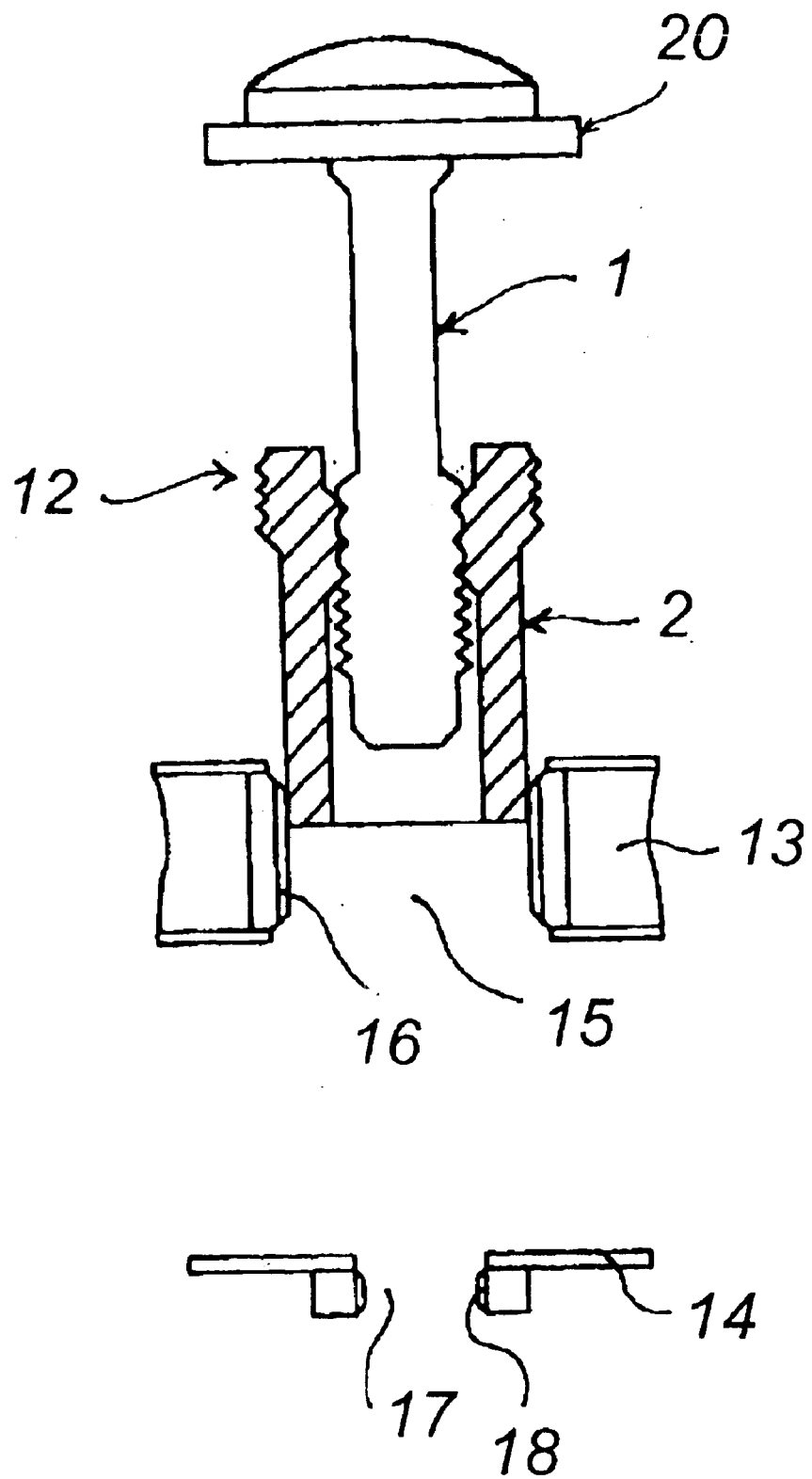
FIG. 8 is a partial, cross sectional view showing one step (a state in the course of inserting the collar bolt into the first member) of a method of fastening two members with the use of the bolt according to the invention.

Subsequently, the bolt is inserted from above while an outer periphery of the collar bolt 2 is slid into the threaded hole 15 of the first member (see FIG. 8).

Figure 9:
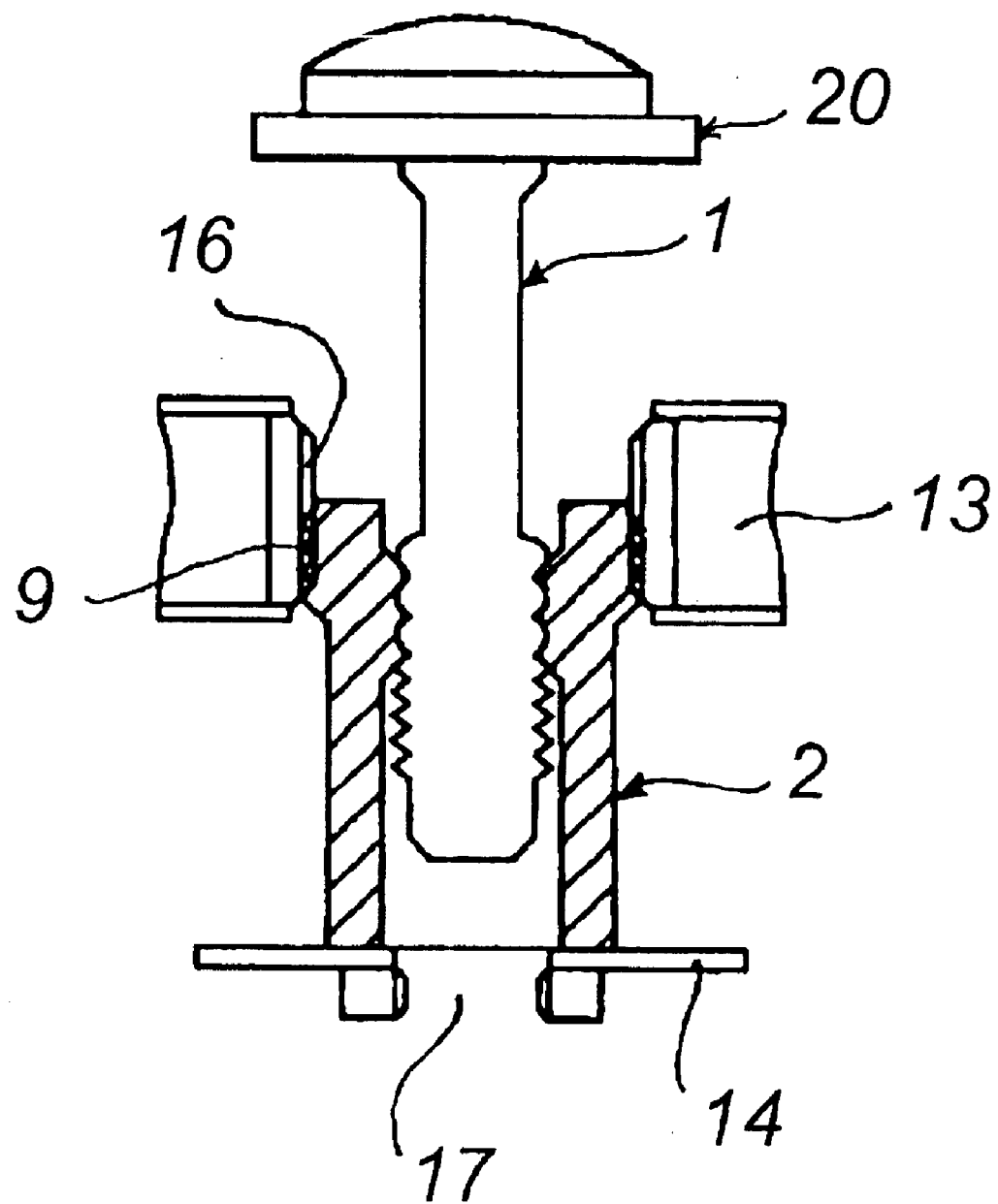
FIG. 9 is a partial, cross sectional view showing one step (a state, in which a lower end of the collar bolt abuts against a surface of a second member) of a method of fastening two members with the use of the bolt according to the invention.

Then torque is applied on the bolt to rotate the same to cause the external thread portion 9 formed on a part of the outer periphery of the collar bolt to be threaded into an internal thread portion 16 formed in the threaded hole of the first member (engagement of the both is caused by threading of normal thread ridges), and rotation of the bolt is continued until a lower end of the collar bolt abuts against the surface of the second member 14 (see FIG. 9).

In a state shown in FIG. 9, the lower end of the collar bolt abuts against the surface of the second member, so that the collar bolt cannot descend further even when the bolt is further rotated. In this state, when torque is applied further on the bolt, torque above a force capable of continuing such threading is applied on threaded regions of the internal thread portion 11 of the collar bolt and of the special thread ridge portion 8 of the bolt body, whereby the bolt body is caused to separate from the collar bolt and a tip end of the bolt body is inserted into the threaded hole 17 of the second member (see FIG. 10).

Figure 11:
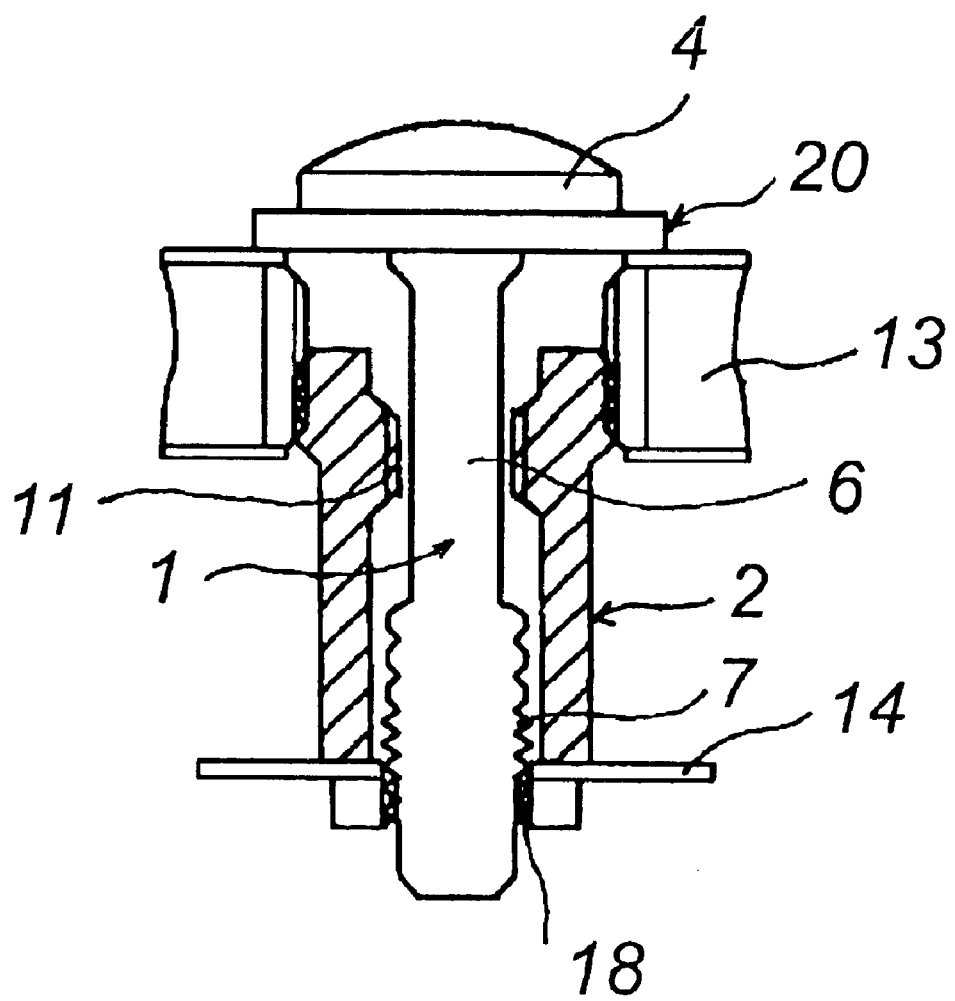
FIG. 11 is a partial, cross sectional view showing one step (a state, in which the bolt body is threaded into the second member) of a method of fastening two members with the use of the bolt according to the invention.

When the bolt body is further rotated, the external thread portion 7 of the bolt body is threaded into an internal thread portion 18 of the second member, and eventually the bolt head 4 presses the first member 13 with the washer 20 therebetween, so that the first member and the second member are bolted integrally (see FIG. 11).

Here, when a length of the bolt body 1 is adequately ensured and the special thread ridge portion 8 on the bolt body is formed in a position (such position may be the same as or different from that of the reduced-diameter thread ridge portion, which needs torque above a predetermined value for release of engagement of the bolt body and the collar bolt 2) where it can thread into the internal thread portion 18 of the second member at the completion of fastening of the first member 13 and the second member 14, torque required to release engagement of the reduced-diameter thread ridge portion and the internal thread portion of the second member becomes exceedingly large, so that a loosening preventive effect in addition to the essential purpose of fastening of two spaced members is given in use in locations continuously subjected to vibrations of an automobile or the like. In addition, in view of the purpose of loosening prevention, the special thread ridge portion typified by the reduced-diameter thread ridge portion may be formed on either of the external thread portion of the collar bolt and the internal thread portion 16 of the first member 13 (However, it is necessary to form the special thread ridge portion so that torque required to release engagement of the collar bolt and the first member due to such additional special thread ridge portion is smaller in value than that required to release engagement the bolt body and the collar bolt).

Also, it is preferable to form serrations or irregularities on a lower end surface of the collar bolt 2. Since torque applied to the bolt body is exceedingly large as compared with that required for threading among normal thread ridges, the collar bolt to be released the engagement with the bolt body rotates together with the bolt body and it may occur such a matter that the spacing S between the first member and the second member is unexpectedly extended in transition from a state shown in FIG. 9 to a state shown in FIG. 10. Forming the serrations or irregularities thereon contributes to prevent the occurrence of such unexpected matter.

Figure 10:
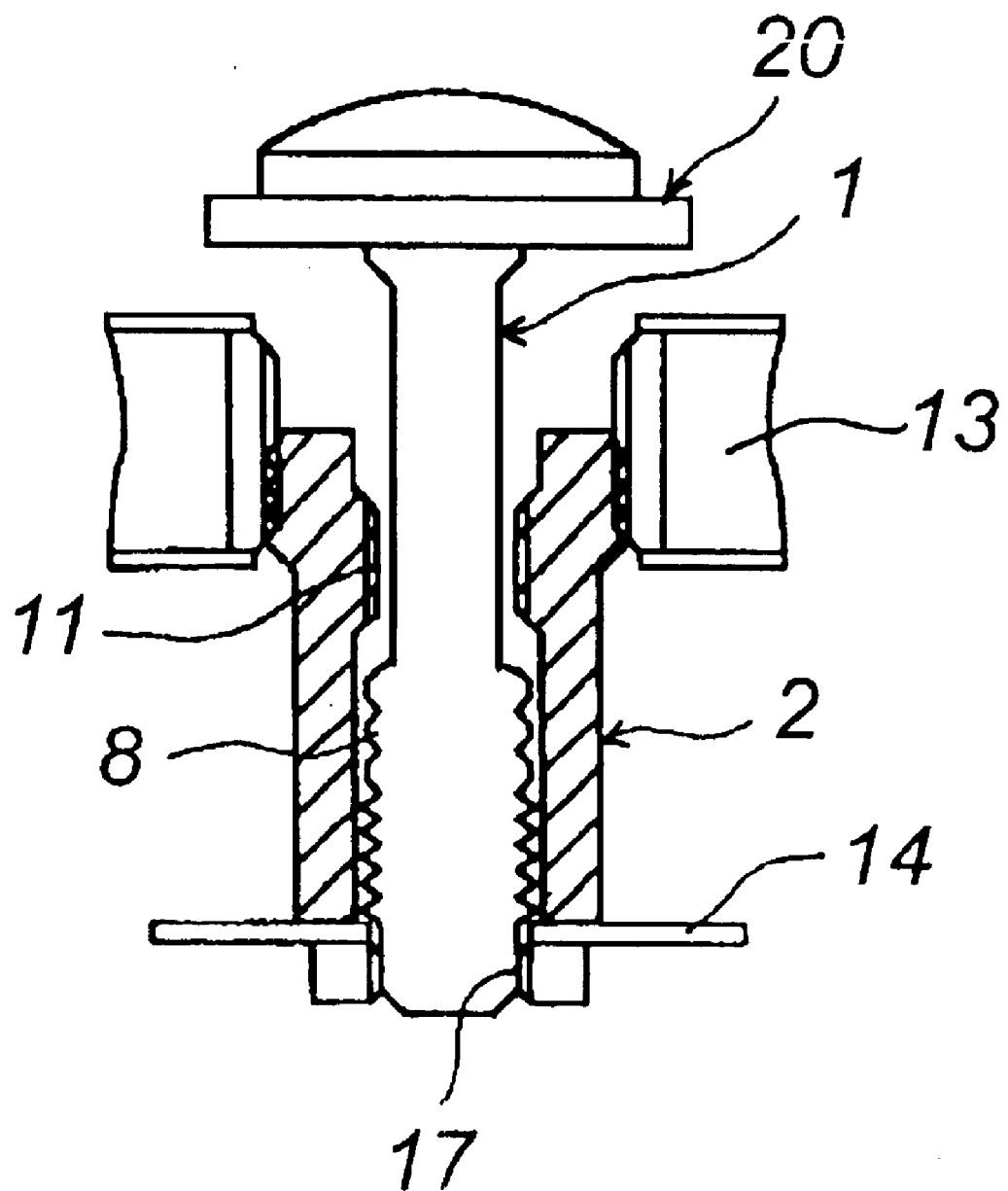
FIG. 10 is a partial, cross sectional view showing one step (a state, in which the bolt body is separated from the collar bolt) of a method of fastening two members with the use of the bolt according to the invention.

In addition, since the bolt according to the invention comprises the small-diameter portion 6 having a smaller diameter than a minor diameter of internal thread of the internal thread portion 11 of the collar bolt 2, a clearance will be produced between the bolt body and the internal thread portion of the collar bolt at the time of transition from a state shown in FIG. 9 to a state shown in FIG. 10. Accordingly, even when the central axis 21 of the threaded hole 15 of the first member 13 and the central axis 22 of the threaded hole 17 of the second member 14 deviate in relative positions from each other, the bolt body can shift in the clearance to thereby absorb such positional deviation to bolt the both members integrally.

As described above, even when a spacing S between two spaced members 13, 14 being fastened to each other is dispersed in dimension and the central axes 21, 22 of the threaded holes of the both members are dispersed in relative positions, a length of the collar bolt 2, hence, a length of the bolt body 1, ranges, in which thread ridges are formed on the collar bolt and the bolt body, and diameters of the internal thread portion 11 of the collar bolt 2 and of the small-diameter portion 6 of the bolt body can be appropriately selected to absorb dispersion involved in the both members and integrally fasten the both members to each other.

Meanwhile, when it is desired to release fastening of the first member 13 and the second member 14 in repair or the like, such release can be readily performed by rotating the bolt body 1 in a direction opposite to a direction of fastening and removing the bolt. More specifically, threading of the bolt body 1 and the second member 14 is released as in FIG. 11 FIG. 10, and the bolt body and the collar bolt 2 are again threaded to each other as shown in FIG. 9. However, it is possible that torque, with which the special thread ridge portion 8 on the bolt body and the internal thread portion 11 of the collar bolt engage with each other, is decreased due to deformation of either of or the both of them caused by threading of them when the both members are fastened to each other. In such case, the collar bolt may be dismounted from the first member by further reversely rotating the bolt body, leave the collar bolt as it is, removing only the bolt body from the first member 13 and the second member 14 and then setting a predetermined tool in the hexagonal recess 10 for torque transmission for reverse rotation.

Figure 12:
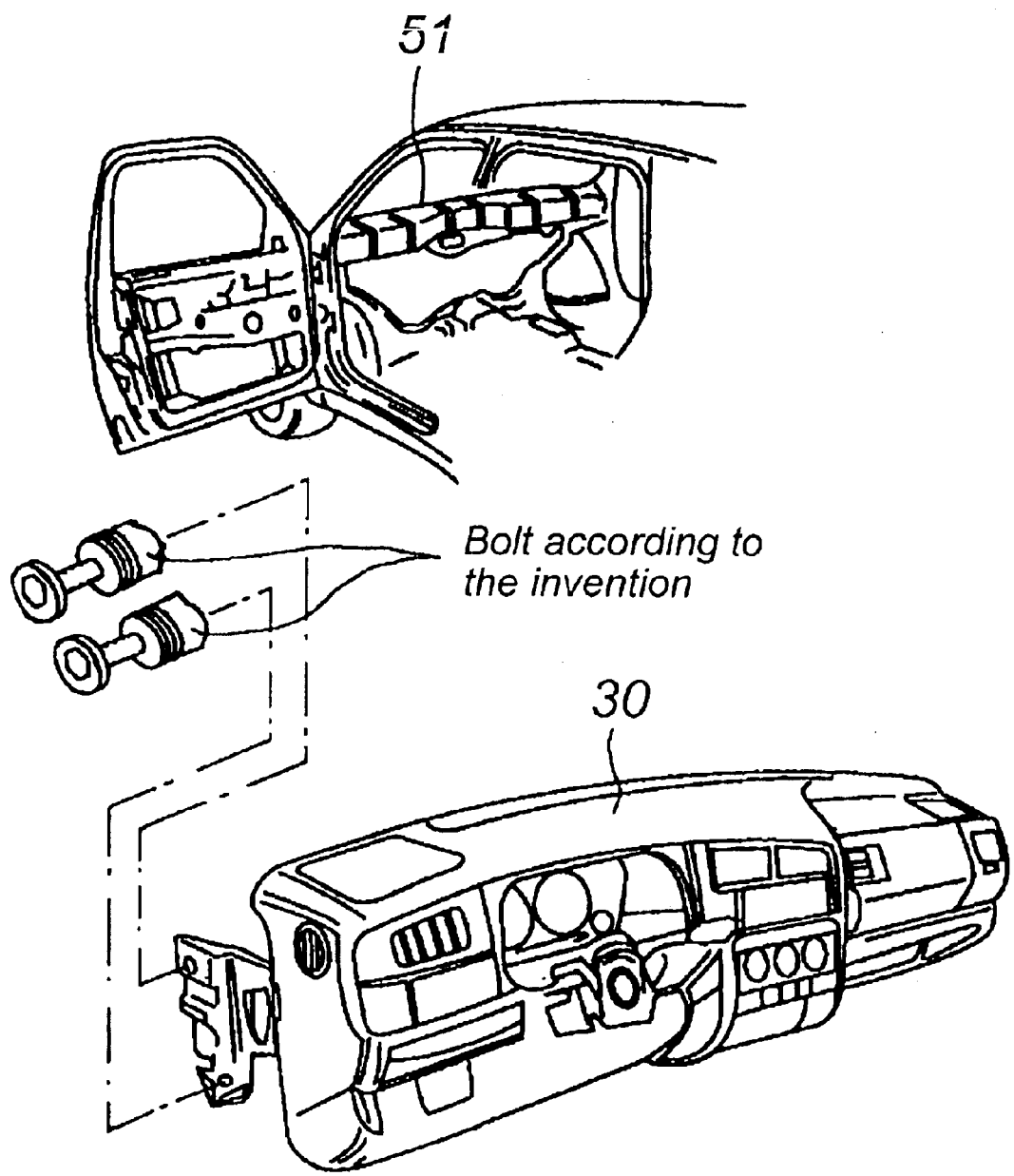
FIG. 12 is a perspective view illustrating a state, in which the bolt according to the invention is used to mount an inner panel reinforcement on a body.
Figure 13:
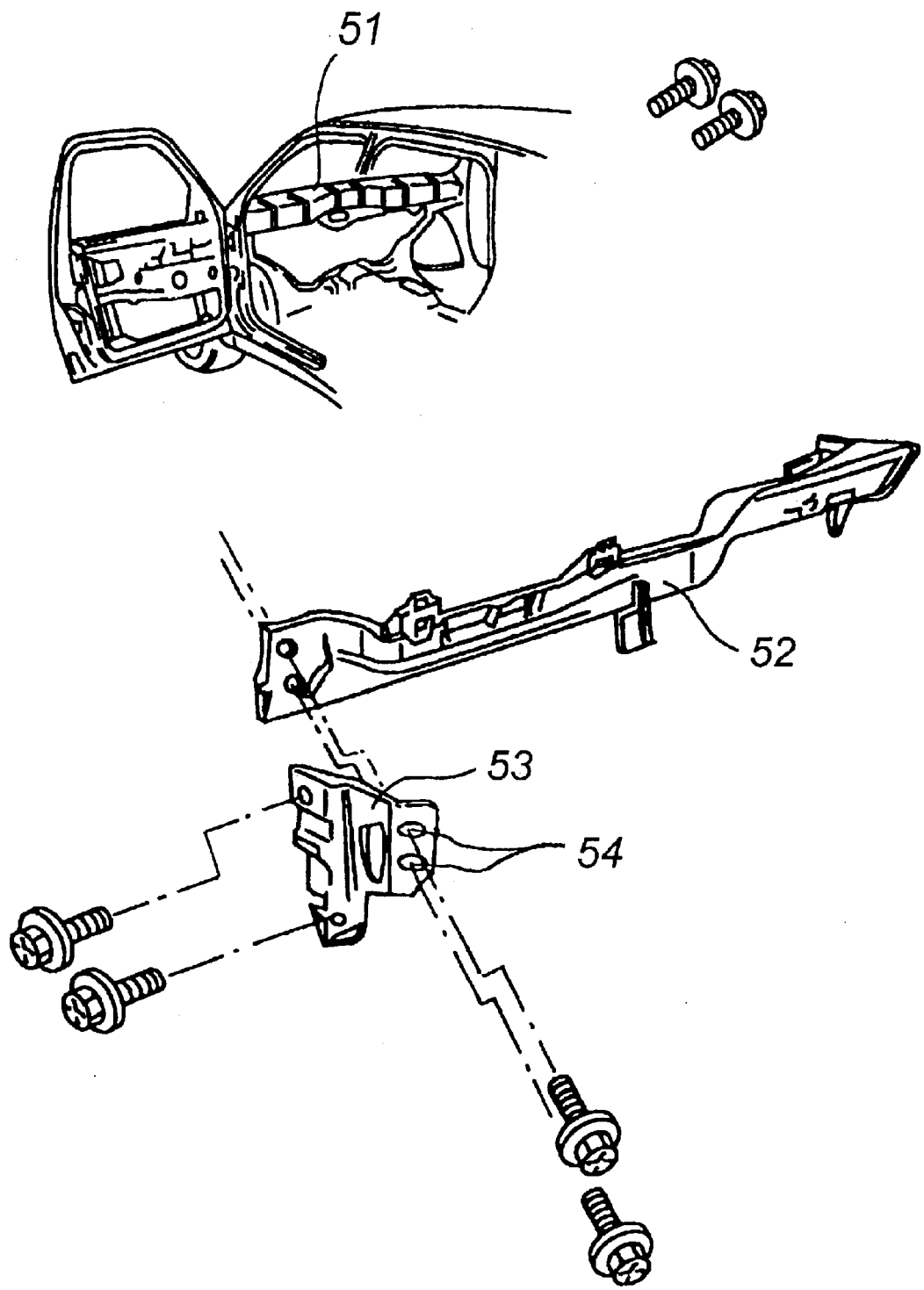
FIG. 13 is a perspective view illustrating a state, in which an inner panel reinforcement is mounted on a body in the prior art.

As described above, the bolt according to the invention functions to accommodate a spacing S between the first member 13 and the second member 14, which are to be fastened to each other, and dispersion in relative positions of the central axes 21, 22 of the threaded holes of the members, so that an inner panel reinforcement or a module unit 30 including an inner panel reinforcement inevitably involving dispersion as shown in FIG. 12 can be directly and readily fastened to a body 51 without the use of any separate adjustment member as in the prior art when the bolt according to the invention is applied.

Industrial Applicability

As described above, the bolt according to the invention comprises a collar bolt and a bolt body, which can absorb dispersion in a spacing between a first member and a second member, which are spaced away from each other and are to be fastened to each other, and dispersion in relative positions of central axes of the members, and so can surely fasten the both members to each other and remove one of them from the other. Also, with a member fastening method using the bolt according to the invention, it is possible to readily fasten a member such as an inner panel reinforcement or the like to a body with the use of only the bolt and without the use of any adjustment member, thereby enabling improving the workability of assembly.

What is claimed is:

1. A bolt comprising:

a bolt body having a bolt head and a bolt shank extending from the bolt head; and a cylindrically shaped collar bolt surrounding the bolt shank and having a cylindrical outer peripheral surface with external thread and a cylindrical inner peripheral surface with internal thread;

wherein the bolt shank comprises an external thread portion with external thread and a small-diameter portion formed between the bolt head and the external thread portion;

wherein the small-diameter portion has a smaller diameter than a minor diameter of the external thread formed on the external thread portion;

wherein the external thread formed on the external thread portion of the bolt shank is adapted to thread into the internal thread formed on the inner peripheral surface of the collar bolt so that engagement between the external thread formed on the external thread portion of the bolt shank and the internal thread formed on the inner peripheral surface of the collar bolt is canceled by a torque which is not less than a predetermined value; and wherein when the engagement between the external thread formed on the external thread portion of the bolt shank and the internal thread formed on the inner peripheral surface of the collar bolt is canceled, a clearance is produced between the collar bolt and the small-diameter portion of the bolt shank to permit the bolt shank to move radially relative to the collar bolt.

2. The bolt according to claim 1, wherein one of (I) a part of thread ridges of the internal thread formed on the inner peripheral surface of the collar bolt and (ii) a part of thread ridges of the external thread formed on the external thread portion of the bolt shank, comprises a first thread ridge portion which is shaped such that crests of the first thread portion are pressed in a radial direction.

3. The bolt according to claim 1, wherein one of (I) a part of thread ridges of the internal thread formed on the inner peripheral surface of the collar bolt and (ii) a part of thread ridges of the external thread formed on the external thread portion of the bolt shank, comprises a second thread ridge portion which has a pitch different from a pitch of thread ridges of a remaining portion.

4. The bolt according to claim 1, wherein one of (i) a part of thread ridges of the internal thread formed on the inner peripheral surface of the collar bolt and (ii) a part of thread ridges of the external thread formed on the external thread portion of the bolt shank, comprises a third thread portion coated by a thin layer of a nylon resin.

5. The bolt according to claim 1, wherein one of (i) a part of thread ridges of the internal thread formed on the inner peripheral surface of the collar bolt and (ii) a part of thread ridges of the external thread formed on the external thread portion of the bolt shank, comprises a fourth thread portion that comprises an elastic body.

6. The bolt according to claim 2, wherein the collar bolt and bolt shank are adapted to fasten together a first member comprising a first threaded hole formed with internal thread capable of threading into the external thread formed on the outer peripheral surface of the collar bolt, and a second member comprising a second threaded hole formed with internal thread capable of threading into the external thread formed on the external thread portion of the bolt shank, and wherein the first member is latched by the bolt head with the bolt shank inserted through the first threaded hole, and the second member is positioned such that thread ridges of the first thread portion formed on the bolt shank are capable of threading into the internal thread formed on the second threaded hole.

7. The bolt according to claim 3, wherein the collar bolt and bolt shank are adapted to fasten together a first member comprising a first threaded hole formed with internal thread capable of threading into the external thread formed on the outer peripheral surface of the collar bolt, and a second member comprising a second threaded hole formed with internal thread capable of threading into the external thread formed on the external thread portion of the bolt shank, and wherein the first member is latched by the bolt head with the bolt shank inserted through the first threaded hole, and the second member is positioned such that thread ridges of the second thread portion formed on the bolt shank are capable of threading into the internal thread formed on the second threaded hole.

8. The bolt according to claim 4, wherein the collar bolt and bolt shank are adapted to fasten together a first member comprising a first threaded hole formed with internal thread capable of threading into the external thread formed on the outer peripheral surface of the collar bolt, and a second member comprising a second threaded hole formed with internal thread capable of threading into the external thread formed on the external thread portion of the bolt shank, and wherein the first member is latched by the bolt head with the bolt shank inserted through the first threaded hole, and the second member is positioned such that thread ridges of the third thread portion formed on the bolt shank are capable of threading into the internal thread formed on the second threaded hole.

9. The bolt according to claim 5, wherein the collar bolt and bolt shank are adapted to fasten together a first member comprising a first threaded hole formed with internal thread capable of threading into the external thread formed on the outer peripheral surface of the collar bolt, and a second member comprising a second threaded hole formed with internal thread capable of threading into the external thread formed on the external thread portion of the bolt shank, and wherein the first member is latched by the bolt head with the bolt shank inserted through the first threaded hole, and the second member is positioned such that thread ridges of the fourth thread portion formed on the bolt shank are capable of threading into the internal thread formed on the second threaded hole.

10. The bolt according to claim 2, wherein the collar bolt comprises a torque transmitting portion at an end thereof in an axial direction, and wherein when the torque transmitting portion is torqued, the collar bolt is rotated in the axial direction.

11. The bolt according to claim 3, wherein the collar bolt comprises a torque transmitting portion at an end thereof in an axial direction, and wherein when the torque transmitting portion is torqued, the collar bolt is rotated in the axial direction.

12. The bolt according to claim 4, wherein the collar bolt comprises a torque transmitting portion at an end thereof in an axial direction, and wherein when the torque transmitting portion is torqued, the collar bolt is rotated in the axial direction.

13. The bolt according to claim 5, wherein the collar bolt comprises a torque transmitting portion at an end thereof in an axial direction, and wherein when the torque transmitting portion is torqued, the collar bolt is rotated in the axial direction.

14. A method of fastening a first member and a second member using the bolt according to claim 1, wherein the first member comprises a first threaded hole formed with internal thread capable of threading into the external thread formed on the outer cylindrical surface of the collar bolt, and the second member comprises a second threaded hole formed with internal thread capable of threading into the external thread formed on the external thread portion of the bolt shank, the method comprising:

engaging the internal thread formed on the collar bolt with the external thread formed on the external thread portion of the bolt shank;

torquing the bolt head to rotate the bolt in an axial direction, thereby threading the external thread formed on the outer peripheral surface of the collar bolt into the internal thread formed on the first threaded hole of the first member;

torquing the bolt head by the torque not less than the predetermined value to rotate the bolt body in the axial direction, thereby separating the bolt body from the collar bolt; and torquing the bolt head further to rotate the bolt body in the axial direction and to engage the external thread formed on the external thread portion with the internal thread formed on the second threaded hole, thereby fastening the first member and the second member together.

15. A method of unfastening the first member and the second member fastened together using the method of claim 14, the method comprising:

torquing the bolt head to rotate the bolt body in a direction opposed to the axial direction, thereby canceling engagement between the internal thread formed on the second threaded hole and the external thread formed on the external thread portion of the bolt shank;

torquing the bolt head to rotate the bolt body in the direction opposed to the axial direction, thereby engaging the internal thread formed on the inner peripheral surface of the collar bolt with the external thread formed on the external thread portion of the bolt shank; and canceling the engagement between the internal thread formed on the first threaded hole and the external thread formed on the outer peripheral surface of the collar bolt.

* * * * *